United States Patent [19]

Allen, III

[11] Patent Number: 4,778,602

[45] Date of Patent: Oct. 18, 1988

[54] METHOD OF PRODUCING MULTI-FUNCTIONAL FILTERING MEDIUM

[76] Inventor: Ralph S. Allen, III, 30003 Arena Dr., Evergreen, Colo. 80439

[21] Appl. No.: 856,368

[22] Filed: Apr. 28, 1986

[51] Int. Cl.$^4$ .............................................. B01D 39/04
[52] U.S. Cl. ................................................ 210/502.1
[58] Field of Search ..................... 210/679, 807, 502.1, 210/504, 506, 500.1

[56] References Cited

U.S. PATENT DOCUMENTS

| | | | |
|---|---|---|---|
| 2,093,047 | 9/1937 | Wageningen et al. | 71/27 |
| 2,158,918 | 5/1939 | Townsend | 71/24 |
| 2,317,990 | 5/1943 | Grether | 71/10 |
| 2,992,093 | 7/1961 | Burdick | 71/24 |
| 3,321,296 | 5/1967 | Abbe | 71/24 |
| 3,328,158 | 6/1967 | Marks | 71/24 |
| 3,398,186 | 8/1968 | Schwartz | 260/515 |
| 3,603,643 | 1/1971 | Hirota | 299/9 |
| 3,617,237 | 11/1971 | Nagasawa | 71/24 |
| 3,674,649 | 7/1972 | Formisano et al. | 195/104 |
| 3,770,411 | 11/1973 | Chambers et al. | 71/24 |
| 4,223,449 | 9/1980 | Bodle et al. | 34/9 |
| 4,459,149 | 7/1986 | Moran et al. | 71/24 |
| 4,608,397 | 8/1986 | Reischl | 210/679 |

*Primary Examiner*—Ivars Cintins
*Attorney, Agent, or Firm*—John E. Reilly

[57] ABSTRACT

A filtering medium is economically produced by treating a highly humified peat source with an alkaline solution followed by mixing with a quaternary amine compound until the humic and fulvic acids have precipitated. A filter cake is formed from the residue by various means including acid oxidation, heating with or without acid reagent or by semi-coking to produce a final dried poduct having excellent filtering properties for hydrophobic compounds, as well as ion-exchange capacities for both anions and cations from aqueous solution.

12 Claims, 1 Drawing Sheet

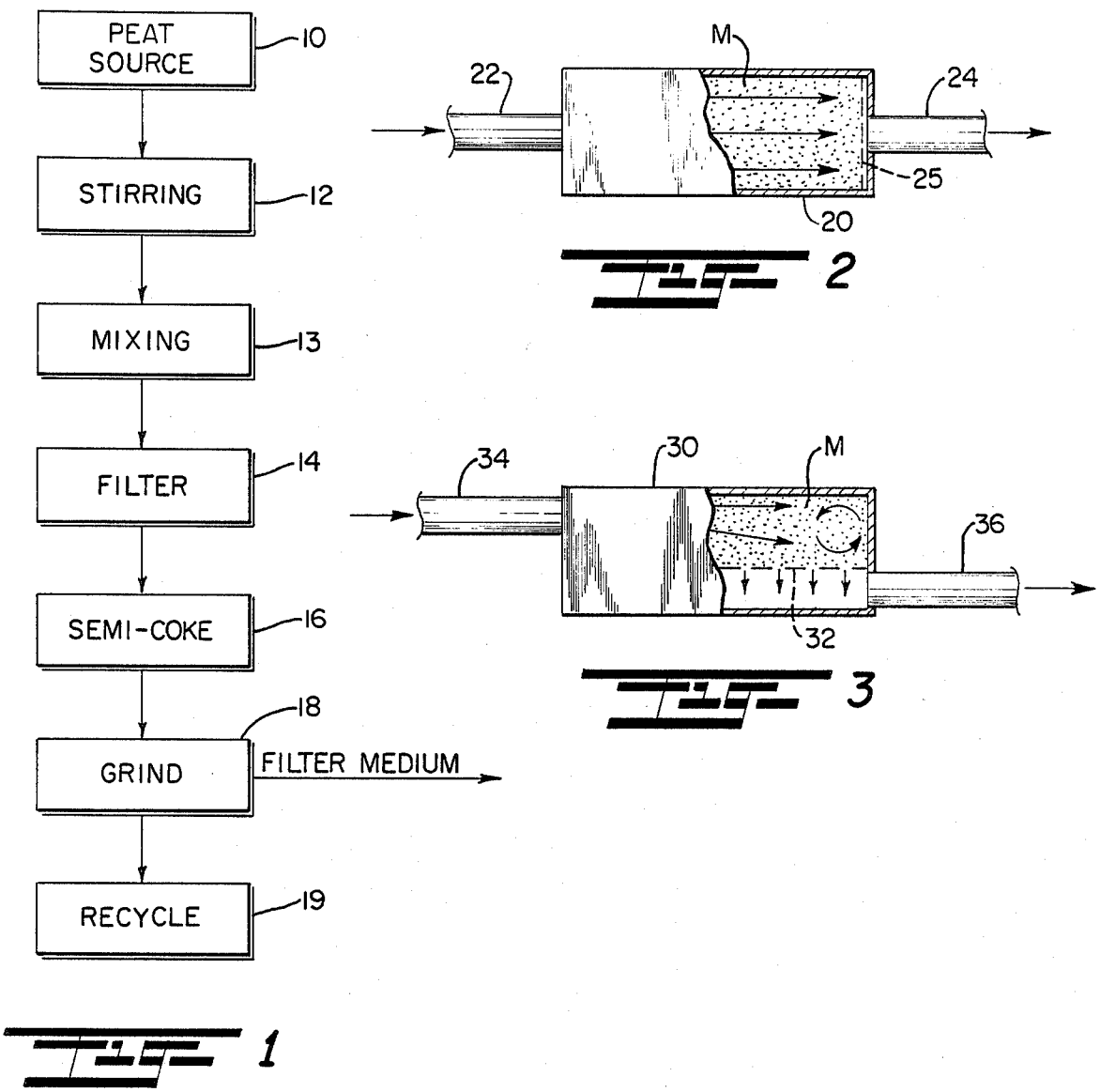

METHOD OF PRODUCING MULTI-FUNCTIONAL FILTERING MEDIUM

This invention relates to filtering media and to methods of producing same; and more particularly relates to a novel and improved multipurpose filtering medium composed of chemically modified peat material for the filtering of hydrophobic, anionic and cationic solubilized compounds and to novel and improved methods of producing same.

BACKGROUND AND FIELD OF THE INVENTION

Peat is commonly used as a filtering medium, both in its raw state as well as in a form which has been chemically treated from its parent material; yet, its application is severely limited by certain inherent characteristics of the material itself. For example, raw peat is physically quite restrictive to the flow of liquid or effluent to be filtered. In addition, it contains fulvic acid which as a soluble fraction can contribute to soluble organic contamination and thus increase the biological oxygen demand; also this soluble organic fraction has been shown to react with chlorine to produce chlorinated organic carcinogens.

Many forms of chemically modified peat have been developed and proposed for use as water filtering media. Activation of peat, either by air-oxidation or wet-oxidation methods, results in the formation of a medium similar to certain activated charcoals that are capable of removing hydrophobic compounds from aqueous solutions. Unlike the activated charcoals, the chemically modified peats have the capacity to remove heavy metal cations from the filtrant. Nonetheless, these peat materials have several limitations in terms of preparation costs, their tendency to chip and shed; and more importantly, have serious chemical limitations, such as, swelling and leaching of organic matter in the presence of alkaline or detergenated solutions.

Synthetic ion-exchange resins which incorporate an inert matrix material, such as, polystyrene or other plastics include an active agent which can exchange a cation for a less desirable cation, or an anion for another anion. These resins, however, are so costly to manufacture that they are generally much too expensive to be used in industrial or commercial applications on a large scale basis. All ion-exchange resins, while useful for cation and anion exchange, have no significant capability for removal of hydrophobic compounds.

U.S. Pat. No. 4,459,149 to E. F. Moran et al is directed to a process for treating humus material including peat which in an intermediate stage of its process forms a dry filter cake which is then converted to a humate salt or to a humic acid; the patent is essentially concerned with the formation of humic substances for agricultural purposes but not to the formation of a filtering medium as an end product. U.S. Pat. No. 3,328,158 to A. L. Marks is directed to the preparation of organic fertilizer by combining nutrient materials with a readily soluble humic acid, such as, peat and of solubulizing materials by a pressurized cooking process followed by the addition of selected calcium-magnesium materials together with nitric acid and phosphoric acid. Other representative patents are U.S. Pat. No. 2,093,047 to J. Wageningen et al; U.S. Pat. No. 2,158,918 to C. S. Townsend et al; U.S. Pat. No. 2,317,990 to E. F. Grether; U.S. Pat. No. 2,992,093 to E. M. Burdick; U.S. Pat. No. 3,321,296 to R. Abbe; U.S. Pat. No. 3,398,186 to N. N. Schwartz; U.S. Pat. No. 3,603,643 to M. Hirota et al; U.S. Pat. No. 3,617,237 to S. Nagasawa et al; U.S. Pat. No. 3,674,649 to M. Formisano et al; U.S. Pat. No. 3,770,411 to J. C. Chambers et al; and U.S. Pat. No. 4,223,449 to W. Bodle et al.

It is proposed in accordance with the present invention to provide for a novel and improved multi-purpose filtering medium which is specifically adapted to use in water and possibly air filtration in which a peat source is chemically modified in such a way as to greatly enhance its filtering capabilitiies. More specifically, a method of producing a filtering medium from a peat source is proposed which is economical, suitable for high volume production, and capable of producing a material which is stable with high ionic exchange rates and hydrophobic absorption over a wide pH range.

SUMMARY OF THE INVENTION

Accordingly, it is an object of the present invention to provide for a novel and improved filter medium and to a method of making the same from a chemically modified peat source in an economic and reliable manner.

Another object of the present invention is to provide for a novel and improved filtering medium specifically adaptable for use in filtering water which is resistant to alkaline solution leaching, possesses both cation and anion exchange capacities, has a density greater than water, is extremely hard and demonstrates excellent flow characteristics in column and fluid-bed systems.

A further object of the present invention is to provide for a novel and improved filtering medium which does not swell in solution or leach organic matter into aqueous solutions or otherwise break down and leach organic composition compounds over a wide pH range when used as a water filtering medium.

It is an additional object of the present invention to provide a filtering material having a hard carbon dense nature which resists physical breakdown in different environments, has hydrophobic absorption capacity so as to lend itself well to removal of hazardous organic substances, is biodegradable, but can be made to be bacterial static or germicidal as required through chemical alterations and is non-toxic.

A still further object of the present invention is to provide for a novel and improved method of making a filtering medium from a peat source which is cost-effective to produce both in terms of production and material costs and procedures and is conformable for use in small batch as well as mass production operations.

In accordance with the present invention, an all-purpose filtering medium has been devised which is composed of a chemically modified peat source in which the humic and fulvic acid fractions thereof are "locked" into the resultant heterogenous structure. The structure has a density greater than 1.0 with a hardness and stability such that it can be ground to the desired mesh size to operate as an effective filtering medium over extended time periods without undergoing changes in its physical and chemical characteristics. The method of producing the filtering medium of the present invention is characterized by the steps of intermixing a highly humified source of peat into an alkaline aqueous solution for a time period sufficient to solubulize the humic and fulvic acid fractions of the peat, introducing a quaternary amine compound into the solution in an amount sufficient to precipitate the humic and fulvic acid fractions, followed by removing the solid residue including the humic and fulvic acid fractions and drying same into a hard dense filter cake.

Various steps may be practiced in the drying or dehydration of the solid residue including but not limited to treating by acid oxidation, heating with or without acid reagents or by semi-coking. The preferred treatment is a semi-coking procedure in which the residue is placed in a closed container under pressure and heated into the range of 200° C.–1000° C., thereby reducing oxidation of the residue and increasing its porosity. Heating under pressure is continued for a period of four to five hours or longer until the material has hardened but has not reached complete dryness. The resultant material is in the form of a hard cake which can be ground into particles of the desired mesh size.

The above and other objects, advantages and features of the present invention will become more readily apparent than the following detailed description when taken together with the accompanying drawings, in which:

FIG. 1 is a flow diagram illustrating the steps followed in a preferred method in accordance with the present invention;

FIG. 2 illustrates a typical application of the filtering medium of the present invention in a column flow application; and FIG. 3 illustrates another typical application of the filtering medium of the present invention in a fluid bed filtering system.

DETAILED DESCRIPTION OF THE PREFERRED EMBODIMENT

Referring to the drawings, there is shown by way of illustrative example in FIG. 1 the preferred process of the present invention in which a peat source designated at 10 is stirred into an alkaline aqueous solution to solubilize the humic and fulvic acid fractions as designated at 12. The resultant solution is mixed at 13 with dimethyldi (hydrogenated-tallow) ammonium chloride in order to precipitate all soluble fractions out of the solution. The solid matter is then removed from solution at 14 and activated by a semi-coking procedure as represented at 16. The resultant product forms an extremely hard cake which can be ground to the desired mesh size as at 18. Any fines can be recycled back through the system as represented at 19 or used as a surface active oil coagulant. The following is a typical series of chemical reactions which take place in the process of the present invention:

The reaction of an organic acid with that of a base must be examined in order to understand how the organic "salt" product of this reaction becomes soluble in water. First of all, organic acids in general are virtually insoluble in aqueous solutions due to a lack of ionic charge; however, when these same organic acids are reacted with a base, they become highly charged to produce the deprotonated salt form. For example:

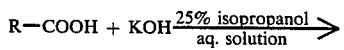   a.

$$R{-}COO^-(aq.) + K^+(aq.)$$

and this mechanism works precisely in the same manner for the organic fractions of peat which display a high polyacidic group character, i.e., fulvic and humic acid fractions.

On the other hand, when the quaternary amine is added to an alkaline solution, where both the fulvic and humic acid fractions are solubilized in salt form, the following reaction takes place:

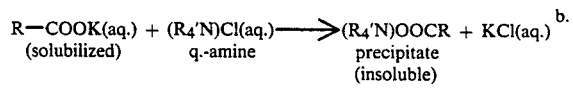   b.

wherein R' is a lipid or tallow and R is a carbon backbone containing multi-functional groups as a part of the humic macro-molecular structure. The final product of this reaction has once again lost its charged ionic nature and thus becomes hydrophobic or water insoluble.

Not all of the acidic reactive groups are "coupled" with the quaternary amine but rather just enough of these sites are reacted to prevent the solubilization of the molecule under strong alkaline conditions.

Highly humified peat in its raw state may be generally characterized as having lost much of its distinctly or highly fibrous plant material remains, thus containing considerable amorphous material content. In general, peat as a humic substance can be divided into three main fractions: (a) humic acid which is soluble in dilute alkaline solutions but which can be precipitated by acidification of the alkaline extract; (b) fulvic acid which is the humic fraction which remains in the acidified solution and is soluble in an acid or base; (c) the humic fraction that cannot be extracted by a dilute base or acid and is customarily referred to as humin. Humus-containing matter may be subdivided into three main components; namely, non-humic organic, humic substances and inorganic material. The humic substances consist of the fulvic acids, humic acids and humin. In the preparation of the filtering media, peat is the humic substance of choice in that it constitutes a substantially pure source of humic or organic matter due to its low content of mineral matter and its high content of decomposed organic matter.

For the purpose of illustration and not limitation the following peat samples were found to exhibit favorable characteristics in the preparation of the filtering medium:

(a) Irish peat was obtained from a blanket bog at a depth of 3.5 feet from the Agricultural Institute, Peatland Expermental Station, Glenamoy, Co. Mayo, Ireland. The peat appeared dark brown in color with a high content of amorphous solids (i.e. nonfibrous material), yet, some distincly fibrous plant remains could be visually detected. Thus, this sample represents a highly 'humified' source i.e. advanced degree of decomposition.

(b) Colorado peat was obtained from Guanella Pass, Col. at an altitude of 11,669 feet above sea-level at a depth of 1 foot below the surface of the bog. Plantlife in the surrounding area, high above timberline, consisted mainly of mosses, lichens, some grasses and alpine wildflowers. The peat was highly fibrous with little observable amorphous material content. It appeared medium brown in color and not nearly as compacted as that of the Irish peat.

(c) Canadian Sphagnum was commercially purchased from the Fafard Peat Moss Company of Shippegan, N.B. This sample appeared to have the highest fibrous content with readily observable plant tissues and very little amorphous content could be recognized. It was a very light tan in color and crumbled easily to the touch.

EXAMPLE 1

10 grams of a highly humified peat in its raw state, preserved in a naturally moist condition, is vigorously stirred into 100 ml of 0.5M sodium or potassium hydroxide for a period of approximately one hour. To this solution an industrial grade quality quaternary amine compound is added with continuous mixing until all of the solubilized organic matter consisting essentially of the humic and fulvic acid fractions have precipitated. This is accomplished with varying amounts of quaternary amine to approximately 0.95 grams depending upon the peat source selected, its moisture content, and the specfic quaternary compound selected. The remaining insoluble residue is collected either by centrifugation at moderate speeds up to 2700 rpm or by passing the mixture through coarse filter paper, such as Whatman #41, under low vacuum.

The moist cake is transferred to an evaporating dish and 20 ml of concentrated reagent grade nitric acid or sulfuric acid is added. The evaporating dish is placed upon a hot plate, and the temperature is raised until the aqueous acid solution is visually observed to begin fuming typically at a temperature on the order of 200°–250° C. This process is allowed to continue until all of the acid solution has evaporated to dryness leaving only a hard cake residue. The cake is then ground to the desired mesh size. The fines may be recycled back through the system with a fresh batch to minimize waste.

The use of oxidizing acids helps to create a better cation exchange material displaying an improved capacity to remove metal cations from aqueous solution. The use of such "fuming acids" in the preparation process, however, not only requires specialized handling and equipment but also could be a source of toxic air pollution. In addition, the added expense of acid oxidation makes the technique in this example of limited cost effectiveness.

EXAMPLE 2

The solubilization and precipitation steps as described in Example 1 are followed by the additional step of adding an inert material such as, a washed sand of uniform mesh size along with the addition of the acid prior to the evaporation step described in Example 1. The mixture must be periodically stirred while heating to insure even coating of the particulates with the chemically treated peat medium. This modification serves to reduce the cost of the final product by coating it upon the inert material so as to increase the surface area of the filtering medium. Any residual fines may be recycled back through with a fresh batch to minimize waste.

This modification of Example 1 serves to increase product quantity without the addition of expensive reagents. Thus this added inert material does address in part the problem of the high cost of producing the filtering medium. Otherwise, it suffers the same fuming acid handling and cost effectiveness problems as Example 1.

EXAMPLE 3

Following the initial preparation procedure and the collection of the filtering cake, described in Example 1, the residue is allowed to air-oxidize in an oven at 250° C.–300° C. for 24 hours without the use of the oxidizing acid reagents. The cake is then ground to a desired mesh size. Again, the fines may be recycled back through with a fresh batch.

By eliminating the need for the oxidizing acids, the cost of producing the filtering medium is reduced. The charring process using this method, however, is difficult to control and is often uneven, resulting in a heterogeneous end product lacking uniformity in both chemical and physical properties. Further, complete drying of the medium renders it hydrophobic thus making it very hard to re-wet.

EXAMPLE 4

The procedure followed in Example 1 is performed in the absence of atmospheric oxygen by placing the mixture of the residual peat cake and the oxidizing acid into a covered pyrex dish and heating at 250° C.–300° C. for extended periods of time (upwards of four to five days). This modification to the previous procedure does not allow for the rapid loss of moisture, nor does it allow prolonged exposure to atmospheric oxygen. The cake is then ground to a desire mesh size. The fines may be recycled back through the procedure with a fresh batch to minimize waste.

This modification avoids the complete dessication of the final product. The heating of the cake for several days, however, is not very cost effective.

EXAMPLE 5

The solubilizing and precipitation steps of Example 1 are followed. The residue is placed into a closed container where a pressure of 40 psi is generated by heating the moist material to 200° C.–1000° C. Heating under pressure is continued for approximately four to five hours or longer until a very hard material is formed but which has not gone to complete dryness. The cake is then ground to a desired mesh size. As before, fines may be recycled back through the procedure with a fresh batch to minimize waste.

The last Example produces an outstanding final product without the requirement of using oxidizing fuming acids, excessive long heating or air oxidation. Quality control is maintained by combining heating and pressure control. By adding an inert material, as in Example 2, to the residue, it is possible to produce a high quality medium capable of removing organic hydrocarbons, metal cations and toxic anions from water. It is found that a concentration of 40% quaternary amine (dimethyl-dihydrogenated beef tallow) ammonium chloride by weight with highly humified peat will produce a filtering medium having 0.172 meq/gm or $Na^+$ cation exchange while displaying hydrophobic absorption capacity as well as alkalinity resistance to 13.4 pH for solubilization of the organic matter. A lower concentration of 10% quaternary amine by weight with 90% peat results in a filtering medium having 0.42 meq/gm in $Na^+$ cation exchange with somewhat lower alkaline leaching resistance, up to pH 10.8, and a lower hydrophobic absorption capacity.

The following is a detailed breakdown of the experimental results from the foregoing Examples 1 to 5 using milliequivalent/gm as a standard measure for Sodium ($Na^+$) cation exchange capacities:

TABLE I

| Peat Type | QA Used | QA/Peat Weight(gm) (Dry Weight) | Exchange Capacities (meq/gm) |
|---|---|---|---|
| EXAMPLE 1: | | | |
| Canadian Sphagnum | 1 | 0.94/10.1 | ND |

TABLE I-continued

| Peat Type | QA Used | QA/Peat Weight(gm) (Dry Weight) | Exchange Capacities (meq/gm) |
|---|---|---|---|
| Canadian Sphagnum | 2 | 0.95/10.0 | 0.041 |
| Canadian Sphagnum | 3 | 0.98/9.9 | 0.067 |
| Irish Peat | 1 | 0.93/10.2 | ND |
| Irish Peat | 2 | 0.86/9/8 | 0.54 |
| Irish Peat | 3 | 0.95/10.2 | 0.69 |
| Colorado Peat | 1 | 1.03/10.5 | ND |
| Colorado Peat | 2 | 0.99/10.0 | 0.13 |
| Colorado Peat | 3 | 0.98/10.2 | 0.20 |
| EXAMPLE 2: | | | |
| Irish Peat | 3 | 0.92/10.0 | 0.38 |
| EXAMPLE 3: | | | |
| Irish Peat | 3 | 1.03/9.8 | 0.24 |
| EXAMPLE 4: | | | |
| Irish Peat | 3 | 0.97/10.0 | 0.67 |
| EXAMPLE 5: | | | |
| Irish Peat | 3 | 0.95/9.9 | 0.42 |
| Irish Peat | 3 | 3.98/10.0 | 0.172 |

Notations:
ND = Not determined
QA#1 = dimethyldicocoa ammonium chloride
QA#2 = dimethyl (hydrogenated tallow) benzyl ammonium chloride
QA#3 = dimethyldi (hydrogenated tallow) ammonium chloride From Example 1, Canadian Sphagnum has the least degree of decomposition, followed by Colorado Peat and then Irish Peat. That is to say, as the organic matter displays a greater degree of decomposition, the material will also have a greater number of phenoxy and carboxylic functional groups per gram of material. These functional groups (i.e., R—OH and R—COOH) represent those groups most responsible for cation exchange with an acidic proton "$H+$".

When a given quaternary amine is used within the same method of preparation, while varying only the peat source, it can be seen that the more decomposed (i.e., humified) the peat, the greater the cation exchange capacity of the final filtering medium.

Another trend found within this set of data establishes that the quaternary amine of choice determines the degree of cation exchange capacity of the final medium. Not only does dimethyldi(hydrogenated tallow)ammonium chloride produce a final medium with a greater cationic exchange capacity over that produced with dimethyl (hydrogenated tallow)benzyl ammonium choride, but it is approved by the FDA as a food additive having little known toxicity to laboratory animals and is biogradable. For these reasons, all additional tests utilized only Irish Peat and the dimethyldi(hydrogenated tallow) ammonium chloride exclusively, while changing parameters of preparation in the following Examples.

Referring to Examples 2 to 5, having established which quaternary amine and peat source is best, certain changes in preparation parameters were examined with the dual objective of minimizing cost of preparation while either maintaining cation exchange capacity or increasing it. With respect to the various advantages or disadvantages of each preparation method, as it addresses the foregoing goals, these have been described previously.

However, Example 5, which does not require the use of oxidizing acids, was taken one step further. In one case, the Irish Peat was treated with approximately 10% of quaternary amine to peat while in the second case the medium was prepared with nearly 40% quaternary amine to peat (weight of quaternary reagent to peat on a dry basis). While the medium prepared with the lesser weight percentage of quaternary amine displayed a greater cationic exchange capacity than did that of the higher quaternary concentration, the higher quaternary concentration medium was able to resist pH leaching of organic material up to 13.4, whereas the medium using the lesser quantity of quaternary amine was only able to resist leaching up to a pH of 10.8. For the most part, the 10% quaternary amine treated peat would be satisfactory for all purposes except that of filtering aqueous solutions of extremely high alkalinity. This would be a rare requirement where an effluent would exceed a pH greater than 10.8; and, even if this requirement should exist, then the solution could be acidified to a pH within operating range of the medium.

The filtering medium (Example 5, 10% quaternary amine to peat) was placed in a 50 ml buret (approximately 1.97 gm medium by dry weight) with a small wad of glass wool placed at the base, and covered with a clean washed sand at the top of the column. The buret was filled with de-ionized water and the air bubbles within the pores of the medium were removed under a vacuum.

The 50 ml solutions of selected model dyes were allowed to pass through the filtering medium at a rate of 10 ml per minute. Those dyes selected were toluidine blue, methyl red and sudan II because of their similarity to commonly used pesticides. Concentrations of the dyes were not initially quantified; however, enough of each were dissolved to produce highly colored solutions. The resulting concentration of the effluents was to be spectroscopically analyzed to determine the compound concentration of "unabsorbed" fraction not taken up by the filtering medium. However, in each case, all of the dye was removed from the solutions.

The filtering medium described herein does not suffer from many of the economic, physical, or chemical limitations of the filtration media in common use today. This filtering medium has been found to have none of these restrictions and, in addition, displays many desirable characteristics including removal of organic compounds, heavy metal cations, and anions over a wide range of pH. These suggest the ability to be used as a cost-effective, multi-purpose media for all applications where pure water is required.

Specifically, the invention has been shown to have the following capabilities as a universal filtering medium:

1. Removal of model organic compounds representing hazardous hydrophobic organic compounds from aqueous solutions (e.g. herbicides, pesticides, polychlorinated bipenyls, etc.).

2. Removal of toxic anions (such as $NO_3^-$, $NO_2^-$, $I^-$, $Br^-$, etc.) from aqueous solutions by ion exchange with chloride ($Cl^-$).

3. Removal of heavy metal cations from aqueous solution by ion-exchange with protons ($H^+$), e.g., $Hg^+$, $Pb^+$, $Se^+$, $Cd^+$, etc.

Other desirable characteristics of this invention are the following:

1. Has a density slightly greater than 1.0, thus can be readily used in column packed apparatus, or submerged in aqueous fluid bed filtering apparatus.

2. Is extremely hard and carbon dense which does not swell and which renders it very resistant to chipping, scaling, or shedding under turbulent conditions, such as, found in fluid bed filtering apparatus.

3. Can be incinerated for either disposal of toxic hydrocarbons or recovery of rare metals from the ash.

4. Is biodegradable by common soil bacterium, thus allowing for the chemical breakdown of many hazardous hydrocarbons by means which do not contribute to air pollution. At the same time, if desired, it can be prepared to be bacterial static or bacterial cytotoxic by the incorporation of organic germicides, e.g. benzyl derivative quaternary amines, or inorganic germicides, e.g., silver nitrate within the matrix of the medium compound.

5. Does not leach organic matter into the aqueous solution over a wide range of pH from 0 to 13.4.

6. Is prepared from parent materials that are virtually non-toxic, e.g., peat and an FDA approved food additive made from beef tallow, thus suggesting its applicability in purification of drinking water and possibly in de-toxification of the human digestive tract by removal of ingested heavy metal cations and/or hazardous hydrocarbons.

The following suggests some of the practical applications of the filtering medium of the present invention: (a) Column flow "in line" household water filtering for removal of undesirable organics, heavy metals and anions; (b) Portable filtration system for field use; Filtration of brackish, poisoned or polluted water to produce potable drinking water, particularly valuable for military and others where clean drinking water is not available; (c) Treatment of municipal water supplies to remove organics, heavy metals, and anions; (d) Tailings-pond treatment of mining and/or industrial effluents by sedimentation agitation of filtering media; and (e) Waste water treatment of municipal sewage at the tertiary stage to remove residual contaminants. The filtering means of the present invention demonstrates the ability or characteristics to have potential application for removal of toxic metals as well as hydrocarbons from the intestinal tract by ingestion of the filtering medium; also the removal of oil from water surfaces, such as, oil spills by sprinkling the finely powdered filtering media. In the latter application, oil will be absorbed before the medium becomes wetted, following which the contaminated means will settle to the bottom of the water body thereby holding the oil and becoming part of the bottom sediment. Other potential applications include the recovery of rare or valuable metals from leachate solutions and the filtration of toxic dust and gases from air.

There is illustrated in FIG. 2 one practical application of the present invention to a column flow apparatus wherein the filter medium M is packed into a cylinder 20, opposite ends of the cylinder being closed except for inlet port 22 at one end and an exhaust or exit port 24 at the opposite end. A retaining screen 25 is positioned across the exit end of the cylinder. The incoming effluent is introduced through the inlet port 22 and, upon filtering by passage through the tightly packed filter medium M, will exit directly through the port 24. In the column flow application, preferably the filtering medium is ground to a mesh size on the order of 350–500; however, mesh size may be varied as per flow and filtering requirements.

FIG. 3 illustrates another form of filtering apparatus in which the filtering medium M is packed into a cylindrical casing or canister 30 having a retaining screen 32 extending horizontally across a lower segment of the cylinder. In this particular application, customarily referred to as a fluid bed, an inlet port 34 is positioned at one end of the container adjacent to its upper peripheral edge and an exit port 36 at the opposite end adjacent to its lower peripheral edge. The fluid bed apparatus as described has an advantage over a column flow or in line canister in offering the least resistance to flow of the fluid medium to be filtered and thus smaller particle sizes may be used in the construction of the filter medium in order to achieve greater surface contact with the solution or liquid medium to be filtered. The fluid bed apparatus generally can be expected to be more expensive, occupy a larger area than a column flow apparatus and requires more labor in replacing the filtering medium as it becomes spent.

Although activated carbons have been around for centuries, those which are made from "carbon-dense" materials, such as, hardwoods, coal and coconut shells have only trace cation-exchange capacities on the order of less than 0.06 meg/gm. Yet, "activated" carbons made from these substances display excellent hydrophobic absorption capacities (i.e., hydrocarbon compounds) and are highly resistant to chipping or shedding under turbulent conditions. Activation of peat, however, yields a product displaying both a high cation-exchange capacity and an excellent hydrophobic absorption capability. While activated carbons made from peat have the desirable advantage of cation-exchange over those made from carbon-dense materials, they are subject to shedding, chipping and can be easily crushed under stress. In addition, these peat-derived activated carbons all release, or leach, organic matter (i.e., humic and fulvic acids) into aqueous solutions of pH 8.0 or higher thus causing a contamination problem in itself.

The quaternary amine treated peat displays all the advantages of the "carbon-dense" activated media in terms of hydrophobic absorption capabilities and physical characteristics; yet it possesses cation-exchange capacities found in activated carbons made from peat without the disadvantages of alkaline leaching or swelling.

To a large extent, porosity is directly related to surface area. Thus, where the greatest porosity can be achieved, the maximum "exposure" of those functional groups to the solution containing the species which is to be removed can be realized. In this respect, a toxin will have an increased chance of coming into contact with the chemically active group upon the filtering medium, thereby increasing its chances for reacting with that specific group on the surface of the filtering medium. While a maximum surface area may sound ideal, this must be counterbalanced against creating a weak solid matrix subject to physical breakdown (i.e., chipping, shedding, crumbling, etc.). Generally, the length of coking under pressure and heat determines to what degree the organic medium undergoes thermal decomposition and thus vaporization of both surface and internal constituents in "opening up" the solid matrix.

It is therefore to be understood that various modifications and changes may be made in the method and resultant product formed in the present invention without departing from the spirit and scope of the present invention as defined by the appended claims.

I claim:

1. The method of producing a filtering medium comprising the steps of:
   (a) mixing a source of peat in an alkaline aqueous solution until the humic and fulvic acid fractions in the peat are solubilized;
   (b) precipitating said humic and fulvic acid fractions from said peat and alkaline aqueous solution by introducing into said solution 10-40 parts by weight of quaternary amine 100 parts by weight of the organic fraction of peat and mixing for a time period sufficient to precipitate said humic and fulvic acid fractions therefrom;

(c) removing said humic and fulvic acid fractions from said solution; and (d) dehydrating said humic and fulvic acid fractions so removed to a substantially dry state.

2. The method according to claim 1, in which said humic and fulvic acid fractions are dehydrated by heating to an elevated temperature in a closed, pressurized container for a time period sufficient to dehydrate said fractions to a substantially dry state.

3. The method according to claim 2, said closed, pressurized container being pressurized to a pressure level of 40 psi.

4. The method according to claim 1, including the additional step of grinding the dehydrated fractions to a predetermined mesh size.

5. The method according to claim 1, in which said alkaline aqueous solution is selected from the group consisting of KOH or NaOH.

6. The method according to claim 5, in which said alkaline aqueous solution has a concentration of 0.5N.

7. The method according to claim 1, in which said quaternary amine is a dimethyl dyhydrogenated tallow ammonium chloride.

8. The method of producing a filtering medium comprising the steps of:

(a) mixing a highly humified source of peat in an alkaline aqueous solution until the humic and fulvic acid fractions in said peat are solubilized;

(b) intermixing into said resultant solution a dimethyl (dihydrogenated tallow) ammonium chloride for a time period sufficient to precipitate the humic and fulvic acid fractions from said solution;

(c) recoving said precipitated humic acid and fulvic acid fractions and activating same by dehydrating to a substantially dry state; and (d) grinding the dried resultant product to a desired mesh size.

9. The method according to claim 8, in which said alkaline aqueous solution is selected from the group consisting of KOH and NaOH, said alkaline aqueous solution having a concentration of 0.5N.

10. The method according to claim 8, characterized by dehydrating said fractions by heating at a temperature of 200°-1000° C. in a closed, pressurized container which is pressurized to a level of 40 psi.

11. In the method of producing a filtering medium wherein a source of highly humified peat is treated to remove the humic and fulvic acid fractions therefrom, characterized by the step of activating said humic and fulvic acid fractions by heating to a temperature range of 200°-1000° C. in a closed, pressurized container for a time period sufficient to dehydrate said fractions to a substantially dry state, followed by grinding the resultant product to a predetermined mesh size in the range of 354-500.

12. In the method according to claim 11, in which said container is pressurized to a level of 40 psi.

* * * * *